(12) United States Patent
Gray et al.

(10) Patent No.: US 12,018,212 B2
(45) Date of Patent: Jun. 25, 2024

(54) PLASTICS PYROLYSIS PROCESS WITH QUENCH

(71) Applicant: UOP LLC, Des Plaines, IL (US)

(72) Inventors: David Gray, Homer Glen, IL (US); Scott Nauert, Chicago, IL (US); Yili Shi, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/671,425

(22) Filed: Feb. 14, 2022

(65) Prior Publication Data

US 2022/0340819 A1    Oct. 27, 2022

Related U.S. Application Data (60) Provisional application No. 63/180,427, filed on Apr. 27, 2021.

(51) Int. Cl.
| | | |
|---|---|---|
| *C10B 53/07* | (2006.01) | |
| *B01J 8/18* | (2006.01) | |
| *C10B 47/24* | (2006.01) | |

(52) U.S. Cl.
CPC ............ *C10B 53/07* (2013.01); *B01J 8/1809* (2013.01); *B01J 8/1827* (2013.01); *B01J 8/1845* (2013.01); *C10B 47/24* (2013.01); *B01J 2208/00336* (2013.01); *B01J 2208/00805* (2013.01)

(58) Field of Classification Search
None
See application file for complete search history.

(56) References Cited

U.S. PATENT DOCUMENTS

| 4,153,514 | A | | 5/1979 | Garrett et al. | |
|---|---|---|---|---|---|
| 5,136,117 | A | | 8/1992 | Paisley et al. | |
| 5,608,136 | A | * | 3/1997 | Maezawa | C10G 1/10 |
| | | | | | 588/317 |
| 10,870,739 | B2 | * | 12/2020 | Di Mondo | C08L 23/06 |
| 2011/0089081 | A1 | * | 4/2011 | Srinakruang | C10G 1/002 |
| | | | | | 208/113 |
| 2013/0023706 | A1 | * | 1/2013 | Huber | C10G 1/08 |
| | | | | | 585/242 |
| 2014/0121426 | A1 | * | 5/2014 | Tandon | C10G 1/10 |
| | | | | | 422/187 |
| 2017/0313826 | A1 | * | 11/2017 | Jansen | C08H 8/00 |
| 2019/0119191 | A1 | | 4/2019 | Streiff et al. | |
| 2021/0032545 | A1 | * | 2/2021 | Harandi | C10G 1/10 |
| 2021/0363432 | A1 | * | 11/2021 | Bitting | C10B 49/22 |

FOREIGN PATENT DOCUMENTS

WO    2020252228 A1    12/2020

OTHER PUBLICATIONS

PCT/US2021/070850, International Search Report and Written Opinion dated Oct. 28, 2021.
PCT Search Report & Written Opinion dated Aug. 9, 2022 for PCT/US2022/071955.

* cited by examiner

*Primary Examiner* — Tam M Nguyen
(74) *Attorney, Agent, or Firm* — Paschall & Associates, LLC; James C. Paschall (57) ABSTRACT

A plastic catalytic pyrolysis process that can produce high yields of ethylene, propylene and other light olefins from waste plastics is disclosed. The catalytic product stream is quenched to below catalytic pyrolysis temperature quickly after exiting the reactor or bulk separation from the catalyst. Quench preserves selectivity of light olefinic monomers. The catalytic pyrolysis process can be operated in a single stage or a two-stage process.

18 Claims, 2 Drawing Sheets

FIG.1

FIG. 2

PLASTICS PYROLYSIS PROCESS WITH QUENCH

CROSS-REFERENCE TO RELATED APPLICATIONS

This application claims priority from U.S. Provisional Application No. 63/180,427, filed Apr. 27, 2021, which is incorporated herein in its entirety.

FIELD

The field is the recycling of plastic materials to produce monomers.

BACKGROUND

The recovery and recycle of waste plastics is held with deep interest by the general public which has been participating in the front end of the process for decades. Past plastic recycling paradigms have involved mechanical recycling. Mechanical recycling entails sorting, washing and melting recyclable plastic articles to molten plastic materials to be remolded into a new clean article. However, this mechanical recycling process is unable to achieve the same performance and applications as newly made plastics materials. The melt and remolding paradigm has encountered several limitations, including economic and qualitative. Collection of recyclable plastic articles at materials recovery facilities inevitably includes non-plastic articles that had to be separated from the recyclable plastic articles. Similarly, collected articles of different plastics have to be separated from each other before undergoing melting because the articles molded of different plastics would not typically have the quality of an article molded of the same plastic. Separation of collected plastic articles from non-plastic articles and then into the same plastics added expense to the process that made it less economical. Additionally, recyclable plastic articles have to be properly cleaned to remove non-plastic residues before melting and remolding which also adds to the expense of the process. The recovered plastic also does not possess the quality of virgin grade resins. The burdensome economics of the plastic recycling process and the lower quality of recycled plastic have prevented widespread renewal of this renewable resource.

A paradigm shift has enabled the chemical industry to rapidly respond with new chemical recycling processes for recycling waste plastics. The new paradigm is to chemically convert the recyclable plastics in a pyrolysis process operated at about 350 to 600° C. to liquids. The liquids can be refined in a refinery to fuels, petrochemicals and even monomers that can be re-polymerized to make virgin plastic resins. The pyrolysis process still requires separation of collected non-plastic materials from plastic materials fed to the process, but the monomers and final plastic product can be used in the same applications as virgin materials.

Higher temperature pyrolysis is under investigation and is viewed as a route to convert plastics directly to monomers without further refining. Conversion of plastics back to monomers presents a circular way of recycling a renewable resource that as of yet has not been fully economically developed.

Catalytic pyrolysis of plastics is in exploration. In a single stage catalytic pyrolysis process, the plastic feed and the catalyst are heated together to catalytic reaction temperature. In a two-stage catalytic pyrolysis process, the plastic feed is heated to pyrolysis temperature to produce a vaporous pyrolysate stream which is then contacted with the catalyst. These processes have achieved only lower yields of monomers, instead focusing on liquid yields. What is needed is a viable catalytic process to convert plastic articles back to monomers.

BRIEF SUMMARY

This disclosure describes a plastic pyrolysis process that can produce high yields of monomers from waste plastics. A plastic feed is pyrolyzed and contacted with catalyst at an elevated temperature to produce a vaporous pyrolysate which is contacted with a catalyst to produce a catalytic product stream comprising monomers. To preserve light olefin yield, the catalytic product stream is quenched to below 500° C. In an embodiment, plastic feed is continuously fed to the process. In a further embodiment, the catalyst may be an acidic catalyst having a silica-to-alumina ratio of at least 20. In an even further embodiment, the vaporous pyrolysate may be contacted with the catalyst at a temperature of no less than about 500° C.

DEFINITIONS

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

The term "predominant", "predominance" or "predominate" means greater than 50%, suitably greater than 75% and preferably greater than 90%.

The term "carbon-to-gas mole ratio" means the ratio of mole rate of carbon atoms in the plastic feed stream to the mole rate of gas in the diluent gas stream. For a batch process, the carbon-to-gas mole ratio is the ratio of moles of carbon atoms in the plastic in the reactor to the moles of gas added to the reactor.

The term "silica-to-alumina ratio" means the mole ratio of $SiO_2$ to $Al_2O_3$ present in a substance.

DETAILED DESCRIPTION

We have discovered that quenching the catalytic pyrolysis reaction within a short period of time provides a superior selectivity to light olefinic monomers in a process for converting plastics to monomers. We have learned that catalytically produced light olefinic monomers can degrade at thermal conditions to less valuable products. Hence, it is proposed to quench the catalytic product stream to a temperature below 500° C. after the catalytic reaction or separation from a bulk of the catalyst.

The plastic feed can comprise polyolefins such as polyethylene and polypropylene. Any type of polyolefin plastic is acceptable even if mixed with other monomers randomly or as a block copolymer. Other polymers that can be used with or without other polymers include polyethylene terephthalate, polyvinyl chloride, polystyrene, polyamides, acrylonitrile butadiene styrene, polyurethane and polysulfone. Many different plastics can be used in the feed because the process pyrolyzes the plastic feed to smaller molecules including light olefins.

In an embodiment, the plastic feed stream may be obtained from a materials recycling facility (MRF) that is otherwise sent to a landfill. The plastic feed may be compressed plastic articles from a separated bail of compacted plastic articles. The plastics can be sorted into like types by mechanical means such as optical sorting or density separation. The plastic articles can be chopped into plastic chips or particles.

The plastic feed may be processed in a single-stage or a two-stage process. In a single-stage process, plastic feed is pyrolyzed and catalyzed simultaneously. In a two-stage process, the plastic feed is pyrolyzed and the resulting vaporous pyrolysate stream is catalyzed by contact with catalyst.

Figure 1:
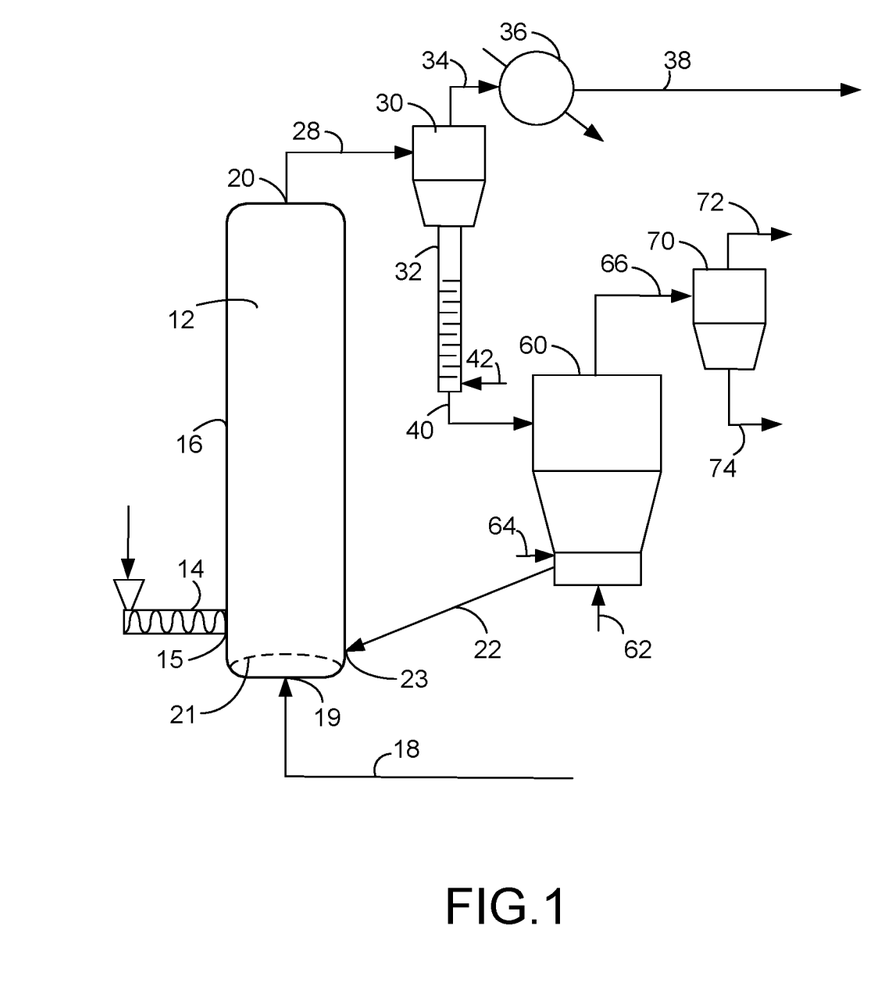
FIG. 1 is a schematic drawing of a process of one embodiment of the present disclosure.

In an embodiment, a single-stage catalytic pyrolysis process may be conducted in fluidized reactor 12 as shown in FIG. 1. An augur 14 or an elevated hopper may be used to continuously transport the plastic feed as whole articles, chips or particles into a pyrolysis reactor 12. Plastic articles, chips or particles may be heated to above the plastic melting point into a melt and injected or augured into the reactor. An augur may operate in such a way as to move whole plastic articles into the reactor and simultaneously melt the plastic articles in the augur by friction or by indirect heat exchange into a melt which enters the reactor in a molten state. Chips or particles may be melted during auguring to the reactor 12 or they may be kept below melting temperature and augured into the reactor as a solid.

The plastic feed may be continuously fed into the reactor 12 by augur 14. In the reactor 12, the plastic feed may be contacted with a diluent gas stream. The diluent gas stream is preferably inert, such as nitrogen, but it may be a hydrocarbon gas. Steam is a preferred diluent gas stream. The diluent gas stream separates reactive olefin products from each other to preserve the selectivity to light olefins thus avoiding recombination of light olefins to heavier molecules or over cracking to light gas.

The diluent gas stream may be provided through a distributor from a diluent line 18 through a diluent inlet 19. The diluent gas may be distributed by a distributor 21 which may be a perforated dished head. The diluent gas stream may be blown into the reactor 12 through the distributor 21 from the diluent inlet 19. The diluent inlet 19 may be in a bottom of the reactor 12. The diluent gas stream may be used to impel plastic feed from the feed inlet 15 of the reactor 12 to an outlet 20 of the reactor. In an aspect, the feed inlet 15 may be at a lower end of the reactor 12, and the outlet 20 may be at an upper end of the reactor. The interior of the wall 16 of the reactor 12 may be coated with refractory lining to insulate the reactor and conserve its heat.

In the single stage process, the catalytic pyrolysis temperature should be at least 500° C., suitably at least 520° C. and preferably at least 530° C. To achieve this reaction temperature the plastic feed may be heated to a catalytic pyrolysis temperature. The catalytic pyrolysis temperature will be much higher than the melting temperature of the plastic to which the plastic may be warmed in the augur 14 when fed to the reactor 12. In a single-stage process, plastic feed is preferably heated to catalytic pyrolysis temperature after entering the reactor 12. In an embodiment, the plastic feed is heated to catalytic pyrolysis temperature by contacting it with a stream of hot catalyst particles. The stream of catalyst may be fed to the reactor in a catalyst line 22 through a catalyst inlet 23. In an aspect, the catalyst inlet 23 may be located between the diluent inlet 19 and the plastic feed inlet 15. The diluent gas stream will then lift, fluidize and move the stream of hot catalyst into contact with the plastic feed the reactor 12 from the feed inlet 15.

It is also contemplated that some or all of the diluent gas stream may impel the catalyst into the reactor 12 in which case the diluent gas stream and the stream of catalyst may enter the reactor 12 through the same inlet (not shown). Additionally, the diluent gas stream may impel the plastic feed into the reactor 12 in which case the diluent gas stream and the plastic feed stream may enter the reactor through the same inlet (not shown). It is also contemplated that the plastic feed stream and the stream of catalyst may be impelled into the reactor 12 by some or all of the diluent gas stream, in which case at least some of the diluent stream, the plastic feed stream and the stream of catalyst may all enter the reactor 12 through the same inlet (not shown).

In another embodiment, the feed inlet 15 and the catalyst inlet 23 may be located in an upper end of the reactor from which they can fall together in a downer reactor arrangement (not shown). The diluent gas stream would not function in this embodiment to upwardly fluidize the feed and catalyst.

Upon heating the plastic feed to pyrolysis temperature in an embodiment by contacting the plastic feed with hot catalyst of about 400 to about 700° C., the plastic feed vaporizes to a vaporous pyrolysate. The catalyst particles contact the vaporous pyrolysate at catalytic pyrolysis temperature of at least 500° C., and the vaporous pyrolysate catalytically pyrolyzes to smaller molecules including light olefins. The structures of the polymers are broken into reactive chemical fragments that are initially formed by depolymerization and volatilization reactions, but do not persist.

Diluent gas from the diluent inlet 19 and distributor 21 may be used to fluidize and impel the catalyst from the catalyst inlet 23 up into contact with the plastic feed stream from the feed inlet 15. The vaporization and conversion to a greater number of moles both increase volume causing rapid movement of feed and pyrolysate toward the reactor outlet 20. Due to the volume expansion of the plastic feed, a diluent gas stream is not necessary to rapidly move feed and product to the outlet. However, diluent gas also serves to separate product olefins from each other and from catalyst particles to prevent recombination and over-cracking which both diminish light olefin selectivity. So, the diluent gas stream may be employed to move the plastic feed stream while undergoing pyrolysis during contact with the stream of hot catalyst toward the reactor outlet 20. In an aspect, we have found that the diluent gas stream may be introduced at a high carbon-to-gas mole ratio of about 0.6 to about 20. The carbon-to-gas mole ratio may be at least about 0.7, suitably at least about 0.8, more suitably at least about 0.9 and most suitably at least about 1.0. In an aspect, the carbon-to-gas mole ratio may not exceed about 15, suitably may not exceed about 12, more suitably may not exceed about 9 and most suitably may not exceed about 7 and preferably will not exceed about 5. The high carbon-to-gas mole ratio importantly reduces the amount of diluent gas that must be separated from other gases including catalytic product gases.

Spherical particles may be most easily lifted or fluidized by the diluent gas stream from the inlet 19. In an embodiment, the catalyst particles should have a smaller average diameter than the plastic articles, chips, particles or melt fed to the reactor through inlet 15. The average diameter of the catalyst particles refers to the average largest diameter of the catalyst particles. The plastic melt may enter the reactor in molten globs that will typically have a larger average diameter than the catalyst particles. The average diameter of the plastic will be the average largest diameter of the articles, chips, particles, melt or globs.

The plastic feed may be catalytically pyrolyzed by rapidly imparting a pyrolysis temperature to the plastic feed and contacting it with catalyst at catalytic pyrolysis temperature for a very short residence time, typically about 0.5 seconds to about 0.5 minutes, to produce a catalytic product stream and then rapidly reducing the temperature of the catalytic product stream before chemical equilibrium can occur. In the single stage operation, thermal pyrolysis and catalytic pyrolysis will happen at the same time. Contacting the plastic feed with the hot catalyst will heat the plastic to pyrolysis temperature.

The pyrolysis process produces a carbon-containing solid called char, coke that accumulates on the catalyst particles and the catalytic product stream comprising hydrocarbons including light olefins and hydrogen gas.

The catalyst particles and the plastic feed stream may be fluidized in the reactor by the diluent gas stream. The plastic feed stream and the stream of catalyst may be fluidized by the diluent gas stream all continuously entering the reactor 12 through their respective inlets. The catalyst and plastic feed stream can be fluidized in a dense bubbling bed. The molten plastic and catalyst may congeal together into globs until the plastic in the glob fully pyrolyzes to vaporous pyrolysate at a temperature from about 400 to about 700° C. In a bubbling bed, the diluent gas stream and vaporous pyrolysate form bubbles that ascend through a discernible top surface of a dense particulate bed. Only catalyst entrained in the gas exits the reactor with the gas. For a plastic feed that is fed as chips or particles to and fluidized in the reactor 12, the superficial velocity of the gas in a bubbling bed is typically less than 3.4 m/s (11.2 ft/s) and the density of the dense bed is typically greater than 475 kg/m$^3$ (49.6 lb/ft$^3$). For a solid plastic feed that is fed as solid articles or fed as a melted chips or particles to the reactor 12, such that the plastic feed and catalyst congeal into globs, the superficial velocity for solid plastic feed will be less than 2.7 m/s (9 ft/s) and the density of the bed will be greater than 274 kg/m$^3$ (17.1 lb/ft$^3$). The mixture of catalyst and gas is heterogeneous with pervasive vapor bypassing of catalyst. In the dense bubbling bed, gases will exit the reactor outlet 20; whereas, the solid catalyst and char may exit from a bottom outlet (not shown) of the reactor 12.

In an aspect, the reactor 12 may operate in a fast-fluidized flow regime or in a transport or pneumatic conveyance flow regime with a dilute phase of catalyst particles. In a further aspect, the reactor 12 may operate as a riser reactor. In a fast-fluidized flow and transport flow regime, the stream of globs of catalyst particles and molten plastic undergoing pyrolysis and gaseous pyrolyzed plastic and the diluent gas stream will flow upwardly together. In both cases, a quasi-dense bed of plastic and catalyst particle globs will undergo pyrolysis at the bottom of the reactor 12. The globs of plastic and catalyst will transport upwardly upon sufficient size reduction due to pyrolysis. The diluent gas stream may lift the plastic feed stream, vaporous pyrolysate and the stream of catalyst.

The mixture of gases and the catalyst may be discharged together from the reactor outlet 20 if a separator 30 is located outside of the reactor 12. If a separator 30 is located in the reactor 12, the gases will be discharged from the reactor outlet 20 and the catalyst and char may exit the reactor 12 from a separate catalyst outlet. Typically, the reactor outlet 20 which discharges the catalyst may be above the catalyst inlet 23. Furthermore, separation of the catalyst from the catalytic product stream may be conducted above the catalyst inlet 23 and/or the feed inlet 15 in transport and fast-fluidized flow regimes.

The density for a fluid feed in the fast-fluidized flow regime will be between at least about 274 kg/m$^3$ (17.1 lb/ft$^3$) to about 475 kg/m$^3$ (49.6 lb/ft$^3$) and in a transport flow regime will be no more than 274 kg/m3 (17.1 lb/ft$^3$). The density for a plastic feed that congeals into globs in the fast-fluidized flow regime will be between about 120 kg/m$^3$ (7.5 lb/ft$^3$) and 274 kg/m$^3$ (17.1 lb/ft$^3$) and in a transport flow regime will be no more than 120 kg/m$^3$ (7.5 lb/ft$^3$). The superficial gas velocity will typically be about 2.7 m/s (9 ft/s) to about 8.8 m/s (28.9 ft/s) in a fast-fluidized flow regime for globs of catalyst congealed with plastic. In a transport flow regime, the superficial gas velocity will be at least about 8.8 m/s (28.9 ft/s) for globs of catalyst congealed with plastic.

On the other hand, if the plastic chips or particles are maintained as chips or particles, respectively, and fluidized as such with the catalyst while avoiding congealing together, the superficial gas velocity will typically be about 3.4 m/s (11.2 ft/s) to about 7.3 m/s (15.8 ft/s) in a fast-fluidized flow regime for fluidized plastic feed. In a transport flow regime, the superficial gas velocity will be at least about 7.3 m/s (15.8 ft/s) for fluidized plastic feed. The diluent gas stream and product gas ascend in a fast-fluidized flow regime, but the hot catalyst may slip relative to the gas and the gas can take indirect upward trajectories. In a transport flow regime, less of the solids will slip. In some fluidized reactors, such as in a riser reactor, residence time for the plastic feed and the vaporous pyrolysate in the reactor may be about 1 to about 20 seconds and typically no more than about 10 seconds.

The reactor effluent comprising catalyst, diluent gas stream and the vaporous catalytic product stream may exit the reactor 12 through the reactor outlet 20 in a reactor effluent line 28 and be transported to a separator 30. In an aspect, the separator 30 may be located in the reactor 12. If the separator 30 is located in the reactor 12, the catalyst, the diluent gas stream and the catalytic product stream will enter into the separator 30 in the reactor 12 and the catalytic product stream and the diluent gas may exit the separator and the reactor 12 together while the bulk of the catalyst stream may exit from the separator back into the reactor or may exit from the separator from the reactor. The catalytic product stream in line 28 will be at a temperature of about 500° C. to about 700° C. and a pressure of about 1.5 to 2.0 bar (gauge).

The separator 30 may be a cyclonic separator that utilizes centripetal acceleration to separate a bulk of the catalyst from the catalytic product stream. The reactor effluent line 28 may tangentially cast reactor effluent into the cyclone separator 30 in a typically horizontally angular trajectory causing the reactor effluent to centripetally accelerate. The centripetal acceleration causes the denser catalyst to gravitate outwardly. The catalyst particles lose angular momentum and descend in the cyclone separator 30 into a lower catalyst bed and exit the cyclone separator. The less dense gaseous product ascends in the cyclone 30 and are discharged into a transfer line 34. In an aspect, catalytic products entrained or adsorbed on the catalyst may be stripped from catalyst in a dip line stripper 32 descending from the cyclone separator 30 by adding a stripping gas such as steam from a stripping line 42 to a lower end of the dip line stripper 32. In this embodiment, stripping gas and a stripped catalytic product stream exit from the stripper 32, enter the separator 30 and ascend into the transfer line 34. A stripped catalyst stream may exit the dip line stripper 32 in line 40.

In an embodiment, a catalytic product stream in the transfer line 34 may be immediately quenched to prevent and terminate hydrogen transfer, recombination, and overcracking reactions which may occur to diminish light olefin monomer selectivity in the high-temperature pyrolysis product stream. Quenching should occur as soon as possible after catalytic pyrolysis and preferably after separation of the catalytic product stream from the bulk of the catalyst. Quenching should occur within 5 seconds, suitably 3 seconds, more suitably 1 second, and preferably 0.5 seconds, of separation of the catalytic product stream from the bulk of the catalyst and preferably within 5 seconds, suitably 3 seconds, more suitably 1 second, and preferably 0.5 seconds of exit from the reactor 12. Quenching should reduce the temperature of the catalytic product stream to below 500° C. and preferably below 450° C. within the foregoing time period.

Quenching may be effected in the following manner although other quenching processes are contemplated. The catalytic pyrolysis product stream may be quench cooled by indirect heat exchange perhaps with water to make steam for the diluent gas stream in a transfer line exchanger 36. The quenched catalytic pyrolysis product stream in line 38 may be at a temperature of less than about 500° C. and suitably about 400 to less than about 500° C. In an aspect, the quenched catalytic pyrolysis product stream in line 38 may be at a temperature of about 250° C. to about 400° C. and suitably no more than 350° C. An additional quench tower may optionally be used to completely quench the catalytic pyrolysis product stream to a temperature of about 30° C. to about 60° C., so lighter components of the vaporous catalytic product stream can condense. The quenched catalytic product stream may exit the transfer line exchanger 36 at around atmospheric pressure, about 1 to about 2 bar (absolute). Quenching deters further reactions from occurring to preserve selectivity of the valuable light olefinic monomers.

Turning back to the separator 30, the stripped catalyst stream in line 40 may have accumulated coke from the catalytic pyrolysis process. Moreover, char residue from the pyrolysis reactor 12 may also end up with the catalyst in the line 40. The catalyst particles have also given off much of their heat in the reactor 12 and need to be reheated. Therefore, the line 40 delivers the catalyst stream with char to a regenerator 60.

In aspect, a predominance of catalyst entering the regenerator 60 pass through the separator 30. In an embodiment, all of the catalyst entering the regenerator 60 pass through the separator 30.

The catalyst and char are fed to the regenerator 60 and contacted with an oxygen supply gas in line 62 such as air to combust char and the coke on the cooler catalyst. The regenerator 60 is a separate vessel from the reactor 12. The coke is burned off the spent catalyst by contact with the oxygen supply gas at combustion conditions in the regenerator 60. Heat of combustion serves to reheat the catalyst. About 10 to about 15 kg of air are required per kg of coke burned off of the catalyst. A fuel gas stream in line 64 may also be added to the regenerator 60 if necessary, to produce sufficient additional heat to drive the pyrolysis reaction in the reactor 12. The fuel gas may be obtained from paraffins recovered from the catalytic product stream in line 38. Exemplary regeneration conditions include a temperature from about 650° C. to about 1000° C. and a pressure of about 1 to about 5 bar (absolute) in the regenerator 60.

A stream of regenerated catalyst is recycled from the regenerator 60 to the reactor 12 in line 22 through the catalyst inlet 23 at a temperature of the regenerator 60. Flue gas and entrained char exit the regenerator in line 66 and are delivered to a cyclone 70 which separates exhaust gas in an overhead line 72 from a solid ash product in line 74.

In a two-stage catalytic pyrolysis process, plastic feed is pyrolyzed to a vaporous pyrolysate stream and the vaporous pyrolysate stream is subjected to catalytic pyrolysis. In the first step of the two-stage process, the plastic feed is subjected to pyrolysis at pyrolysis temperature in a first zone or reactor. The pyrolysis reactor may be a continuous stirred tank reactor (CSTR), a rotary kiln, an augured reactor or a fluidized bed. In the pyrolysis reactor the plastic feed stream is heated to a pyrolysis temperature in a pyrolysis zone that pyrolyzes the plastic feed stream to a provide a vaporous pyrolysis stream. The reactor provides enough residence time for predominantly all of the plastic in the plastic feed stream to convert to a vaporous pyrolysate stream.

The pyrolysis zone may operate at a temperature from about 400° C. (752° F.) to about 700° C. (1292° F.), or preferably about 500° C. (932° F.) to about 600° C. (1112° F.), a pressure from about 0.069 MPa (gauge) (10 psig) to about 1.38 MPa (gauge) (200 psig), or preferably about 0.138 MPa (gauge) (20 psig) to about 0.55 MPa (gauge) (80 psig). For example, a heated inert, diluent gas stream may be flowed through or over the plastic feed to heat the plastic feed to pyrolysis temperature. Alternatively, the plastic feed and diluent gas may be heated together and the vaporous pyrolysate driven off the plastic feed may be carried in the diluent gas stream. An inert diluent gas may comprise nitrogen or steam. The diluent gas stream may also be used to fluidize the plastic feed stream. The diluent gas stream may be added to the reactor at a rate of about 17 $Nm^3/m^3$ (100 scf/bbl) to about 850 $Nm^3/m^3$ plastic feed (5,000 scf/bbl), or more preferably about 170 $Nm^3/m^3$ (1000 scf/bbl) to about 340 $Nm^3/m^3$ plastic feed (2000 scf/bbl). The diluent gas stream may serve to reduce impure gas partial pressure in the vaporized pyrolysis gas stream.

The pyrolysis reactor or zone may contain a guard bed to trap solids or adsorb impurities in the vaporous pyrolysate stream. An example of an adsorbent for the guard bed is alumina. The thermal pyrolysis reaction converts the plastic feed to an intermediate molecular composite which can be more readily catalyzed in the catalytic reaction stage. A vaporous pyrolysate stream may be withdrawn from the pyrolysis zone. In an embodiment, the vaporous pyrolysate stream is carried in the inert gas stream to the second catalytic stage of the process.

The vaporous pyrolysate stream may be transported or passed to a catalytic reactor or zone. In an embodiment, the catalytic reactor may comprise a second catalyst bed in a vessel downstream of a guard bed and/or the pyrolytic reactor section. In another embodiment, the vaporous pyrolysate stream in the diluent gas stream or by itself may be sprayed or distributed into a bed of catalyst in the catalytic zone to fluidize the catalyst bed. Alternatively, another gas stream, such as a diluent gas stream, may be sprayed or distributed into the catalyst bed to fluidize the catalyst and the vaporous pyrolysate stream may be distributed into the fluidized catalyst. The catalytic reactor may be operated according to the reactor 12 of FIG. 1.

In the two-stage process, the temperature in the catalytic zone may be higher than in the pyrolysis zone. The catalytic zone may be at a higher temperature than in the pyrolysis zone because in the pyrolysis reactor, the plastic feed melts, vaporizes and partially cracks which has an endothermic effect which absorbs much heat from the heater. The vaporous pyrolysate stream entering the catalytic reactor may then predominantly undergo catalytic reactions of which some are endothermic but absent the melting and vaporization already achieved in the pyrolysis reactor, the catalytic reactor demands less heat from the heater and thus rises to a higher reaction temperature. The catalytic pyrolysis temperature in the catalytic reactor should be at least 500° C., suitably at least 520° C. and preferably at least 530° C.

Similar catalyst can be used in both single and two-stage processes. In an embodiment, the catalyst is acidic. The catalyst may be a molecular sieve. In an embodiment, the catalyst may be an acidic molecular sieve. In a further embodiment, the catalyst is a zeolitic or a non-zeolitic molecular sieve. In an embodiment, the catalyst is a zeotype material. The catalyst may be a zeolite with 10-membered rings such as having an MFI structure. The catalyst may have 10-membered rings but pores smaller than MFI such as TON and MTT structures and Ferrierite. A zeolite with 8-membered rings or 12-membered rings such as Y-zeolite and beta zeolite may also be suitable.

It is important that the catalyst have low acidity. The acidity of the catalyst can be characterized by a silica-to-alumina ratio. The catalyst with a high silica-to-alumina ratio provides a lower acidity catalyst due to less alumina concentration in the catalyst. With less alumina concentration the acid sites are not as close together thus minimizing side reactions which can be caused by acid sites being near each other. To compensate for lower acidity, temperature should be increased or a lower weight space velocity should be employed to achieve sufficient cracking to monomers. We have found in the single stage process, the silica-to-alumina ratio can be as low as at least 40, preferably at least above 50, and most preferably at least above 80.

Catalytic reactions occurring in the catalytic reactor include: 1) cracking reactions involving carbon-carbon scission which can produce desired light olefins, 2) aromatization in catalyst pores producing aromatics which may take the form of coke, and 3) hydride transfer recombination reactions which produce paraffins. Reaction 1) should be maximized while reactions 2) and 3) should be minimized. The low acidity catalyst operates to impair reactions 2) and 3) preferentially compared to reaction 1), and the elevated temperature preferentially promotes reaction 1) compared to reactions 2) and 3). We have found that decreasing the silica-to-alumina ratio increases the $C_1$-$C_4$ alkane yield at expense of $C_2$-$C_4$ olefin yield.

The smaller pore molecular sieves utilizing 8 membered rings may limit reactions 2) and 3). Large pore molecular sieves with 12-membered rings may be effective so long as the silica-to-alumina ratio is at least 80. The crystallite size of the catalyst can range from 2 nm to 6 μm and typically from about 150 nm to about 3 μm. The weight hourly space velocity should be about 1 $hr^{-1}$ to about 20 $hr^{-1}$, and preferably at least 2 $hr^{-1}$, in the catalytic zone. The gas residence time in the catalytic zone should be short to avoid over-cracking, typically about 0.5 seconds to about 0.5 minutes. The catalyst-to-plastic ratio should range from about 5 to about 80 if a fluidized bed reactor is employed.

In an aspect, the catalyst bed comprises a single catalyst type rather than a mixture of catalyst to provide a uniform chemistry as much as possible. The catalyst in the reactor should comprise at least 70 wt %, suitably at least 75 wt %, more suitably at least 80 wt %, even more suitably at least 85 wt %, preferably at least 90 wt % and most preferably at least 95 wt % of a single catalyst type.

The catalytic pyrolysis process disclosed produces vastly more gas than liquids. The catalytic process results in a gas fraction of at least about 75% and preferably at least 90% and a gas-to-liquid ratio of at least 15 and preferably about 16 to about 300. The gas fraction is the percentage of gas relative to the total product including gas, liquid and coke solids. The gas-to-liquid ratio excludes consideration of coke.

EXAMPLE

Figure 2:
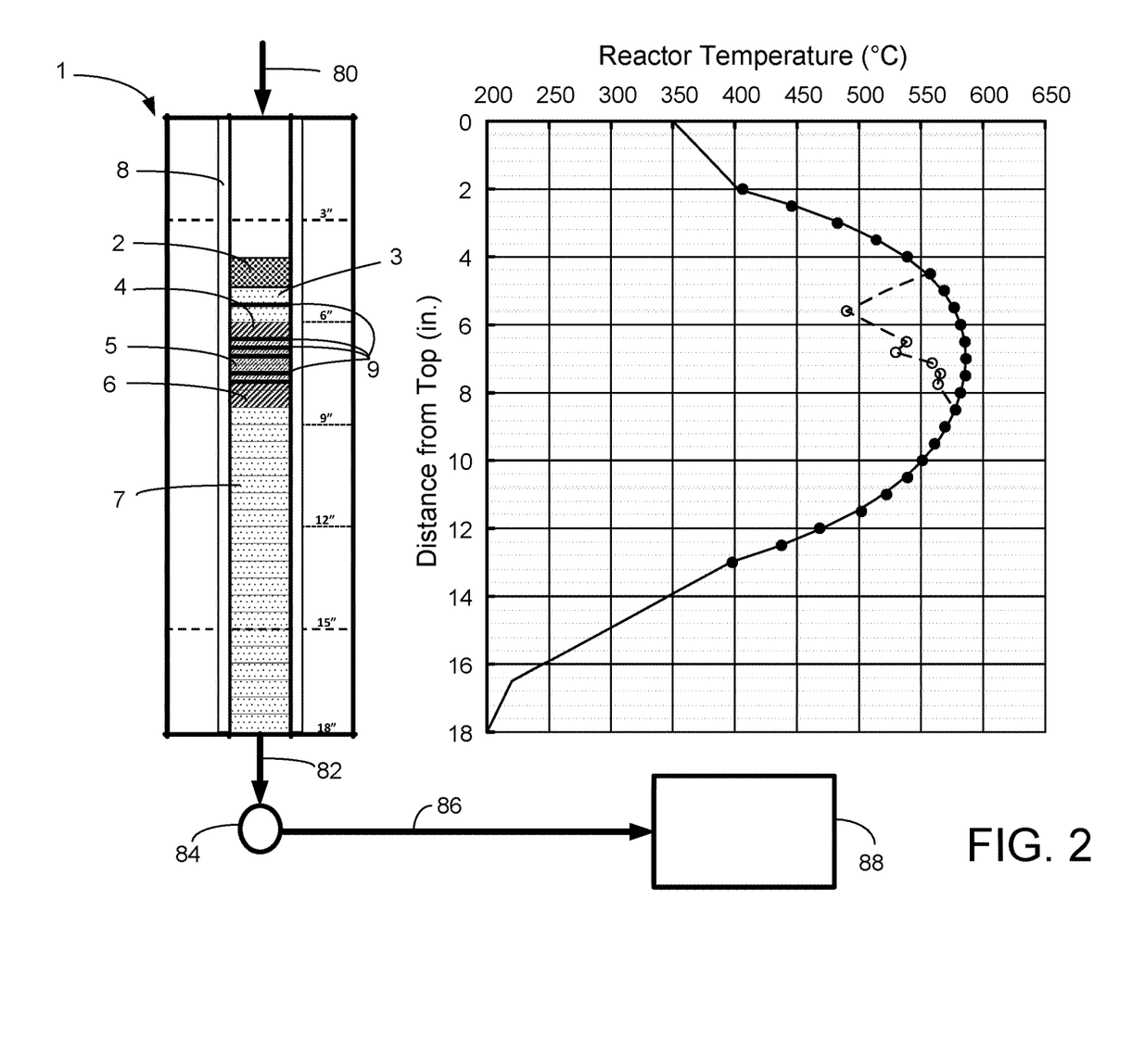
FIG. 2 is a schematic drawing and graph illustrating an example of the present disclosure.

We conducted a pyrolysis reaction of high-density polyethylene (HDPE) plastic feed at elevated temperatures in a two-stage catalytic pyrolysis process. The set-up of a reactor 1 is depicted in FIG. 2. Plastic pellets 2 were continuously fed into a stack on a top of a guard bed 3 of alumina beads at the top of reactor 1. A separation bed 4 of quartz particles separated the guard bed 3 from a top of a fixed catalyst bed or zone 5. The pyrolysis zone should be considered demarcated between a top of the plastic pellets 2 and the bottom of the separation bed 4. Another bed 6 of quartz particles separates a bottom of the catalyst bed 5 from a bottom bed 7 of alumina beads. The reactor 1 was heated by an external furnace 8 surrounding the reactor. A diluent stream 80 of nitrogen was fed to the top of the reactor 1. The diluent stream picked up a vaporous pyrolysate stream generated from heating the plastic pellets 2 and carried it downwardly to the catalyst bed 5 in the reactor 1. In the catalyst bed 5, the vaporous pyrolysate was contacted with the catalyst in the catalyst bed 5. The feed rate targeted 75 wt % HDPE pellets and 25 wt % nitrogen gas.

Thermocouples 9 were spaced along the height of the reactor 1 which registered temperatures shown in the graph at the right in FIG. 2 at corresponding heights from the top of the reactor. Unfilled circles show the temperatures registered by the thermocouples 9 at variance from the temperature profile provided by the external furnace 8 due to the net endothermic reactions in the reactor 1. The catalytic product stream exiting the catalyst bed 5 was quenched to below 500° C. after the 11-inch mark which would have occurred within 2 seconds of separation from the bulk of catalyst in the catalyst bed 5.

A catalytic product stream in line 82 exited the reactor 1 and entered a knock-out pot 84 and was cooled down to 190° C. Uncondensed product gas was fed in line 86 to a gas chromatograph 88 to determine the composition of the reactor effluent.

The catalytic pyrolysis conditions and rough product composition for four runs are shown in Table 1.

TABLE 1

| Run No. | 1120 | 1121 | 1122 | 1123 |
|---|---|---|---|---|
| Catalyst | alpha-Al$_2$O$_3$ | MFI | MFI | MFI |
| Silica/Alumina ratio | 0 | 350 | 80 | 40 |
| Cat. loading (g) | — | 4 | 0.5 | 0.6 |
| Furnace Temp. (° C.) | 600 | 600 | 600 | 600 |
| Rx Temp. (° C.) | 584 | 536 | 538 | 575 |
| WHSV (h$^{-1}$) | — | 4.9 | 44.2 | 28.6 |
| HDPE (g/h) | 17.5 | 19.5 | 22.2 | 17.1 |
| N$_2$ (g/h) | 7.51 | 7.51 | 7.5 | 7.5 |
| Gas (avg. g/h) * | 7.2 | 14.1 | 17.8 | 10.9 |
| Liquid (avg. g/h) | 3.1 | 0.085 | 0.17 | 0.04 |
| Coke (avg. g/h) | 2.8 | 0.87 | 0.52 | 0.54 |
| Gas Fraction (%) | 54 | 93 | 96 | 95 |
| Gas-Liquid Ratio | 2.3 | 16.5 | 105 | 273 |
| Mass Bal. (avg. %) | 75 | 77 | 83 | 67 |

A gas leak and condensation after the gas chromatograph lowered the gas mass balance. However, gas production is much greater than liquid production by one or two orders of magnitude. The product selectivity from the experiments is shown in Table 2 taken at different time periods which did not produce large differences in selectivity.

TABLE 2

| | Time | | | Olefins (wt %) | | | BTX | Alkanes (wt %) | | | Coke |
|---|---|---|---|---|---|---|---|---|---|---|---|
| Run | (hr) | Catalyst | Si/Al$_2$ | C$_2$= | C$_3$= | C$_4$= | Total | (wt %) | C$_1$-C$_4$ | C$_5$-C$_9$ | C$_{10}$+ | (wt %) |
| 1120 | 0.25 | Al$_2$O$_3$ | 0 | 9.6 | 7.3 | 9.3 | 26.2 | 2.4 | 9.4 | 26.9 | 14.5 | 20.5 |
| 1120 | 0.75 | Al$_2$O$_3$ | 0 | 9 | 8.1 | 9.5 | 26.6 | 2.3 | 8.7 | 28.1 | 14.2 | 20 |
| 1120 | 1.25 | Al$_2$O$_3$ | 0 | 9.2 | 7.7 | 8.5 | 25.4 | 2.2 | 8.6 | 27.5 | 15 | 21.2 |
| 1120 | 1.75 | Al$_2$O$_3$ | 0 | 8.9 | 7.4 | 8.6 | 24.9 | 2 | 8.7 | 25.6 | 16 | 22.7 |
| 1120 | 2.25 | Al$_2$O$_3$ | 0 | 9.8 | 8.4 | 9.1 | 27.3 | 1.4 | 9.8 | 23 | 16 | 22.5 |
| 1121 | 0.25 | MFI | 350 | 14.9 | 33.1 | 15.3 | 63.3 | 6.5 | 10.8 | 11.2 | 0.1 | 8.26 |
| 1121 | 0.75 | MFI | 350 | 12.5 | 33.3 | 21.4 | 67.2 | 5 | 8.6 | 12.7 | 0.1 | 6.53 |
| 1121 | 1.25 | MFI | 350 | 11.3 | 33.9 | 18.9 | 64.1 | 5.4 | 8.1 | 17.1 | 0.1 | 5.28 |
| 1121 | 1.75 | MFI | 350 | 10.2 | 32.7 | 24.1 | 67 | 4.6 | 7.1 | 15.7 | 0.1 | 5.4 |
| 1121 | 2.25 | MFI | 350 | 11.5 | 34 | 18.8 | 64.3 | 4.2 | 8.2 | 17.2 | 0.1 | 6 |
| 1122 | 0.25 | MFI | 80 | 11.1 | 25.8 | 19 | 55.9 | 6.1 | 18.9 | 15.6 | 0 | 3.6 |
| 1122 | 0.75 | MFI | 80 | 9.7 | 24.7 | 19.8 | 54.2 | 5.5 | 18.5 | 19.1 | 0 | 2.6 |
| 1122 | 1.25 | MFI | 80 | 11.6 | 27.2 | 19.2 | 58 | 5 | 18 | 15.7 | 0 | 3.2 |
| 1122 | 1.75 | MFI | 80 | 10.2 | 28 | 21.8 | 60 | 5.3 | 15.2 | 16.8 | 0 | 2.7 |
| 1123 | 0.25 | MFI | 40 | 13.9 | 23.2 | 14.1 | 51.2 | 8.6 | 25.5 | 10 | 0 | 4.75 |

Ethylene ranged from about 10 to about 20 wt %, and more precisely, about 11 to about 15 wt % of the product with a silica-to-alumina ratio of at least 40. Propylene ranged from about 20 to about 40 wt %, and more precisely, about 23 to about 34 wt % of the product with a silica-to-alumina ration of at least 40. Butenes ranged from about 10 to about 30 wt %, more precisely about 14 to about 24 wt % of the product. Benzene, toluene and xylenes ranged from about 3 to about 10 wt %, and more precisely about 4 to about 9 wt % of the product. The balance of the product comprised alkanes and coke. Decreasing Si/Al$_2$ ratio increases the C$_1$-C$_4$ alkane yield at expense of C$_2$-C$_4$ olefin yield. Quenching the catalytic product stream within 5 seconds of bulk separation from catalyst preserved light olefin selectivity.

SPECIFIC EMBODIMENTS

While the following is described in conjunction with specific embodiments, it will be understood that this description is intended to illustrate and not limit the scope of the preceding description and the appended claims.

A first embodiment of the disclosure is a process for converting plastics to olefinic monomers comprising heating a plastic feed to a pyrolysis temperature of about 400 to about 700° C. to pyrolyze the plastic feed to provide a vaporous pyrolysate stream; contacting the vaporous pyrolysate stream with catalyst to produce a catalytic product stream comprising olefinic monomers; quenching the catalytic product stream to below 500° C. An embodiment of the disclosure is one, any or all of prior embodiments in this paragraph up through the first embodiment in this paragraph further comprising contacting the vaporous pyrolysate stream with catalyst at a temperature of at least 500° C. An embodiment of the disclosure is one, any or all of prior embodiments in this paragraph up through the first embodiment in this paragraph further comprising separating the catalytic product stream from a bulk of the catalyst and quenching the catalytic product stream to below 500° C. within 5 seconds of the separation. An embodiment of the disclosure is one, any or all of prior embodiments in this paragraph up through the first embodiment in this paragraph further comprising continuously feeding the plastic feed to a pyrolysis zone in which the heating step occurs. An embodiment of the disclosure is one, any or all of prior embodiments in this paragraph up through the first embodiment in this paragraph further comprising passing the vaporous pyrolysate stream to a catalytic zone in which the contacting step occurs. An embodiment of the disclosure is one, any or all of prior embodiments in this paragraph up through the first embodiment in this paragraph wherein the catalytic zone is a moving bed or a fixed bed of catalyst. An embodiment of the disclosure is one, any or all of prior embodiments in this paragraph up through the first embodiment in this paragraph further comprising carrying the vaporous pyrolysate stream in a diluent gas from a pyrolysis zone to the catalytic zone and contacting the vaporous pyrolysate stream in the diluent gas with the catalyst. An embodiment of the disclosure is one, any or all of prior embodiments in this paragraph up through the first embodiment in this paragraph further comprising fluidizing the catalyst with a diluent gas; contacting the catalyst with the plastic feed at pyrolysis temperature to produce the vaporous pyrolysate stream; and contacting the vaporous pyrolysate stream with the catalyst at catalytic pyrolysis temperature to provide the catalytic product stream. An embodiment of the disclosure is one, any or all of prior embodiments in this paragraph up through the first embodiment in this paragraph further comprising separating the catalytic product stream from a bulk of the catalyst and quenching the catalytic product stream. An embodiment of the disclosure is one, any or all of prior embodiments in this paragraph up through the first embodiment in this paragraph further comprising quenching the catalytic product stream to below 450° C.

A second embodiment of the disclosure is a process for converting plastics to olefinic monomers comprising heating a plastic feed to pyrolyze the plastic feed to provide a vaporous pyrolysate stream; contacting the vaporous plastic pyrolysate stream with a catalyst having a silica-to-alumina ratio of at least 20 at a temperature of about 500 to about 700° C. to produce a catalytic product stream comprising olefinic monomers; and quenching the catalytic product stream to below 500° C. An embodiment of the disclosure is one, any or all of prior embodiments in this paragraph up through the second embodiment in this paragraph further comprising separating the catalytic product stream from a bulk of the catalyst and quenching the catalytic product stream to below 500° C. within 3 seconds of the separation. An embodiment of the disclosure is one, any or all of prior embodiments in this paragraph up through the second embodiment in this paragraph further comprising continuously feeding the plastic feed to a pyrolysis zone in which the heating step occurs. An embodiment of the disclosure is one, any or all of prior embodiments in this paragraph up through the second embodiment in this paragraph further comprising passing the vaporous pyrolysate stream to a catalytic zone in which the contacting step occurs. An embodiment of the disclosure is one, any or all of prior embodiments in this paragraph up through the second embodiment in this paragraph further comprising carrying the vaporous pyrolysate stream in a diluent gas from a pyrolysis zone to the catalytic zone and contacting the vaporous pyrolysate stream in the diluent gas with the catalyst. An embodiment of the disclosure is one, any or all of prior embodiments in this paragraph up through the second embodiment in this paragraph further comprising fluidizing the catalyst with a fluidizing gas; contacting the catalyst with the plastic feed at pyrolysis temperature to produce the vaporous pyrolysate stream; and contacting the pyrolysate stream with the catalyst to provide the catalytic product stream. An embodiment of the disclosure is one, any or all of prior embodiments in this paragraph up through the second embodiment in this paragraph further comprising separating the catalytic product stream from a bulk of the catalyst and quenching the catalytic product stream.

A third embodiment of the disclosure is a process for converting plastics to olefinic monomers comprising continuously feeding a plastic feed to a pyrolysis zone; heating a plastic feed to a pyrolysis temperature of about 400 to about 700° C. to pyrolyze the plastic feed to provide a vaporous pyrolysate stream; contacting the vaporous plastic pyrolysate stream with catalyst at a temperature of about 500 to about 700° C. to produce a catalytic product stream comprising olefinic monomers; quenching the catalytic product stream to below 500° C. An embodiment of the disclosure is one, any or all of prior embodiments in this paragraph up through the third embodiment in this paragraph further comprising separating the catalytic product stream from a bulk of the catalyst and quenching the catalytic product stream to below 500° C. within 5 seconds of the separation. An embodiment of the disclosure is one, any or all of prior embodiments in this paragraph up through the third embodiment in this paragraph further comprising fluidizing the catalyst with a fluidizing gas; contacting the catalyst with the plastic feed at pyrolysis temperature to produce the vaporous pyrolysate stream; and contacting the pyrolysate stream with the catalyst to provide the catalytic product stream.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for converting plastics to olefinic monomers comprising:
    heating a plastic feed to a pyrolysis temperature of about 400 to about 700° C. to pyrolyze the plastic feed to provide a vaporous pyrolysate stream;
    contacting the vaporous pyrolysate stream with catalyst to produce a catalytic product stream comprising at least about 50 wt % of olefinic monomers;
    separating the catalytic product stream from a bulk of the catalyst;
    quenching the catalytic product stream to below 500° C. within 5 seconds after said separation.

2. The process of claim 1 further comprising contacting the vaporous pyrolysate stream with catalyst at a temperature of at least 500° C.

3. The process of claim 1 further comprising continuously feeding said plastic feed to a pyrolysis zone in which the heating step occurs.

4. The process of claim 3 further comprising passing said vaporous pyrolysate stream to a catalytic zone in which said contacting step occurs.

5. The process of claim 4 wherein said catalytic zone is a moving bed or a fixed bed of catalyst.

6. The process of claim 5 further comprising carrying said vaporous pyrolysate stream in a diluent gas from a pyrolysis zone to said catalytic zone and contacting said vaporous pyrolysate stream in said diluent gas with said catalyst.

7. The process of claim 1 further comprising fluidizing said catalyst with a diluent gas; contacting said catalyst with said plastic feed at pyrolysis temperature to produce said vaporous pyrolysate stream; and contacting said vaporous pyrolysate stream with said catalyst at catalytic pyrolysis temperature to provide said catalytic product stream.

8. The process of claim 7 further comprising separating the catalytic product stream from a bulk of said catalyst and quenching said catalytic product stream.

9. The process of claim 1 further comprising quenching said catalytic product stream to below 450° C.

10. A process for converting plastics to olefinic monomers comprising:
    heating a plastic feed to pyrolyze the plastic feed to provide a vaporous pyrolysate contacting the vaporous plastic pyrolysate stream with a catalyst having a silica-to-alumina ratio of at least 20 at a temperature of about 500 to about 700° C. to produce a catalytic product stream comprising at least about 50 wt % of olefinic monomers;
    separating the catalytic product stream from a bulk of the catalyst;

quenching the catalytic product stream to below 500° C. within 5 seconds after said separation by heat exchange with water.

11. The process of claim 1 further comprising continuously feeding said plastic feed to a pyrolysis zone in which the heating step occurs.

12. The process of claim 11 further comprising passing said vaporous pyrolysate stream to a catalytic zone in which said contacting step occurs.

13. The process of claim 12 further comprising carrying said vaporous pyrolysate stream in a diluent gas from a pyrolysis zone to said catalytic zone and contacting said vaporous pyrolysate stream in said diluent gas with said catalyst.

14. The process of claim 10 further comprising fluidizing said catalyst with a fluidizing gas; contacting said catalyst with said plastic feed at pyrolysis temperature to produce said vaporous pyrolysate stream; and contacting said pyrolysate stream with said catalyst to provide said catalytic product stream.

15. The process of claim 14 further comprising separating the catalytic product stream from a bulk of said catalyst and quenching said catalytic product stream.

16. A process for converting plastics to olefinic monomers comprising:
    continuously feeding a plastic feed to a pyrolysis zone;
    heating a plastic feed to a pyrolysis temperature of about 400 to about 700° C. to pyrolyze the oxygen free plastic feed to provide a vaporous pyrolysate stream;
    contacting the vaporous plastic pyrolysate stream with catalyst at a temperature of about 500 to about 700° C. to produce a catalytic product stream comprising at least about 50 wt % of olefinic monomers;
    quenching the catalytic product stream to below 500° C.

17. The process of claim 16 further comprising separating the catalytic product stream from a bulk of the catalyst and quenching the catalytic product stream to below 500° C. within 5 seconds of said separation.

18. The process of claim 16 further comprising fluidizing said catalyst with a fluidizing gas; contacting said catalyst with said plastic feed at pyrolysis temperature to produce said vaporous pyrolysate stream; and contacting said pyrolysate stream with said catalyst to provide said catalytic product stream.

* * * * *